(12) United States Patent
Karafotis

(10) Patent No.: US 8,281,186 B1
(45) Date of Patent: Oct. 2, 2012

(54) OPERATIONAL FAILURE MITIGATION

(75) Inventor: Michael S. Karafotis, Glen Allen, VA (US)

(73) Assignee: Bank of America Corporation, Charlotte, NC (US)

( * ) Notice: Subject to any disclaimer, the term of this patent is extended or adjusted under 35 U.S.C. 154(b) by 178 days.

(21) Appl. No.: 12/490,585

(22) Filed: Jun. 24, 2009

(51) Int. Cl.
*G06F 11/00* (2006.01)
(52) U.S. Cl. ......................................... 714/26
(58) Field of Classification Search .................. None
See application file for complete search history.

(56) References Cited

U.S. PATENT DOCUMENTS
2005/0021380 A1* 1/2005 Taylor .............................. 705/7

OTHER PUBLICATIONS

Potential Failure Mode and Effects Analysis (FMEA) Reference Manual, Second Edition, Feb. 1995, pp. 1-2, 27-45, 51, and 53.*
Bowles et al., Threat Effects Analysis: Applying FMEA to Model Computer System Threats, 2008 IEEE.*

* cited by examiner

*Primary Examiner* — Michael Maskulinski
(74) *Attorney, Agent, or Firm* — Weiss & Arons LLP; Michael Springs

(57) ABSTRACT

Apparatus and methods for electronically evaluating the criticality of a weakness in a process. The apparatus and methods may compile and store data related to business priorities and business operations. Subsequent calculations quantifying the impact of a process step failure may incorporate the stored business process data to arrive at a quantified measure of the relative criticality of a failure in the context of the process as a whole.

16 Claims, 12 Drawing Sheets

| | A | B | C | D | E | F | G | H | I | J |
|---|---|---|---|---|---|---|---|---|---|---|
| 1 | | Operational Failure Mitigation Analysis - Business Functions | | | | | | | | |
| 2 | | Project: Login Process | | | | | | | | |
| 3 | | Completed By: | | | | | Completed Date: | | | |
| 4 | | | | | | | | | | |
| 5 | ID | Business Function | Business Criticality | Overall Volume | Weight | | Description/Overview | | | |
| 6 | 1 | Present login page to user | 10 | 140 | 119 | | A resiliency audit of login process. | | | |
| 7 | 2 | Authenticate user and password | 10 | 80 | 90 | | | | | |
| 8 | 3 | Authorize user content | 10 | 80 | 90 | | | | | |
| 9 | 4 | Present special content for subset of users | 10 | 50 | 71 | | | | | |
| 10 | | | | | | | | | | |
| 11 | | | | | | | | | | |
| 12 | | | | | | | | | | |
| 13 | | | | | | | | | | |
| 14 | | | | | | | | | | |
| 15 | | | | | | | | | | |
| 16 | | | | | | | | | | |
| 17 | | | | | | | | | | |
| 18 | | | | | | | | | | |
| 19 | | | | | | | | | | |
| 20 | | | | | | | | | | |
| 21 | | | | | | | | | | |
| 22 | | | | | | | | | | |
| 23 | | | | | | | | | | |
| 24 | | | | | | | | | | |
| 25 | | | | | | | | | | |
| 26 | | | | | | | | | | |
| 27 | | | | | | | | | | |
| 28 | | | | | | | | | | |
| 29 | | | | | | | | | | |

FIG. 3A

Operational Failure Mitigation Analysis - Functional Process Steps

Project: Login Process
Completed By: _____  Completed Date: _____

Functional Process Step vs. Business Function Criticality Matrix

| ID | Step Name | Source Component | Destination Component | Present login page to user | Authenticate user and password | Authorize user content | Present special content for subset of users |
|---|---|---|---|---|---|---|---|
| | | | | 1 | 2 | 3 | 4 |
| 1 | ISP1 to Routers | ISP1 | External Routers | 5 | 5 | 5 | 5 |
| 2 | ISP2 to Routers | ISP2 | External Routers | 5 | 5 | 5 | 5 |
| 3 | External Routers to Firewalls | External Routers | External Firewalls | 10 | 10 | 10 | 10 |
| 4 | Firewalls to Load Balancer | External Firewalls | Load Balancer | 10 | 10 | 10 | 10 |
| 5 | Load Balancer to Web Server | Load Balancer | Web Server | 10 | 10 | 10 | 10 |
| 6 | Web Server to Firewall | Web Server | Internal Firewall | 10 | 10 | 10 | 10 |
| 7 | Firewall to Application Server | Internal Firewall | Application Server | 10 | 5 | 5 | 10 |
| 8 | Application Server to Database Server | Application Server | Database | 1 | 1 | 10 | 1 |

FIG. 3B

Operational Failure Mitigation Analysis

Project: Login Process
Completed By: _____  Completed Date: _____

| | | Functional Process Step | | |
|---|---|---|---|---|
| ID | Step Name | Source Component | Destination Component | Destination Component Failure Mode |
| 1.1 | ISP1 to Routers | ISP1 | External Routers | Hard Outage |
| 1.2 | ISP1 to Routers | ISP1 | External Routers | Degraded functionality, passing traffic but inconsistently [assume happenning in all datacenters] |
| 1.3 | ISP1 to Routers | ISP1 | External Routers | Lose routing pair in 1 datacenter [hard outage ] |
| 2.1 | ISP2 to Routers | ISP2 | External Routers | Hard Outage |
| 2.2 | ISP2 to Routers | ISP2 | External Routers | Degraded functionality, passing traffic but inconsistently [assume happenning in all datacenters] |
| 2.3 | ISP2 to Routers | ISP2 | External Routers | Lose routing pair in 1 datacenter [hard outage ] |
| 3.1 | External Routers to Firewalls | External Routers | External Firewalls | Hard Outage |
| 3.2 | External Routers to Firewalls | External Routers | External Firewalls | Primary device failure(1 datacenter) |

FIG. 3C-1

Completed Date: _____

| F | G | H | I | J | K | L | M | N | O | P | Q | R |
|---|---|---|---|---|---|---|---|---|---|---|---|---|
| Failure Impact | Failure Occurrence Rate | Failure Monitoring (Detection) | Detection | Failure Resiliency (Mitigation) | Resiliency | General impact statement (Effect) | Business Impact: Present login page to user | Business Impact: Authenticate user and password | Business Impact: Authenticate user content | Business Impact: Present special content for subset of users | Business Impact: Overall | MRPN |
| 10 | 0 |  | 10 |  | 0 |  | 50 | 50 | 50 | 50 | 50 | 0 |
| 5 | 1 | Would know that we had a problem, but not know where it was originating | 5 |  | 0 |  | 25 | 25 | 25 | 25 | 25 | 1375 |
| 3 | 1 | Symptoms would be immediately detected, EDS would detect. | 10 | Recover in secondary & tertiary datacenters | 9 | Some sessions would be lost | 15 | 15 | 15 | 15 | 15 | 29 |
| 10 | 0 |  | 10 |  | 0 |  | 50 | 50 | 50 | 50 | 50 | 0 |
| 5 | 1 | Would know that we had a problem, but not know where it was originating | 5 |  | 0 |  | 25 | 25 | 25 | 25 | 25 | 1375 |
| 3 | 1 | Symptoms would be immediately detected, EDS would detect. | 10 | Recover in secondary & tertiary datacenters | 9 | Some sessions would be lost | 15 | 15 | 15 | 15 | 15 | 29 |
| 10 | 0 |  | 10 |  | 0 |  | 100 | 100 | 100 | 100 | 100 | 0 |
| 3 | 3 | Symptoms would be immediately detected, DMZ team monitoring should detect this | 10 | Secondary interfaces for failover .. through we have seen this not work | 9 | failover failures have included situations when policies were not pushed to both devices pair. | 30 | 30 | 30 | 30 | 30 | 171 |

FIG. 3C-2

| | | | | | |
|---|---|---|---|---|---|
| 15 | 3.3 | External Routers to Firewalls | External Routers | External Firewalls | |
| 16 | 4.1 | Firewalls to Load Balancer | External Firewalls | Load Balancer | Hard Outage |
| 17 | 4.2 | Firewalls to Load Balancer | External Firewalls | Load Balancer | Sick-but-not-dead |
| 18 | 4.3 | Firewalls to Load Balancer | External Firewalls | Load Balancer | Hard Outage |
| 19 | 5.1 | Load Balancer to Web Server | Load Balancer | Web Server | 1 Firewall failure in a single facility |
| 20 | 5.2 | Load Balancer to Web Server | Load Balancer | Web Server | DNS unavailable in all three datacenters |
| 21 | 5.3 | Load Balancer to Web Server | Load Balancer | Web Server | 1 DNS server unavailable |
| 22 | 6.1 | Web Server to Firewall | Web Server | Internal Firewall | Compromised through intrusion |
| 23 | 6.2 | Web Server to Firewall | Web Server | Internal Firewall | DNS unavailable in all three datacenters |
| 24 | 6.3 | Web Server to Firewall | Web Server | Internal Firewall | 1 DNS server unavailable |
| 25 | 7.1 | Firewall to Application Server | Internal Firewall | Application Server | Compromised through intrusion |
| 26 | 7.2 | Firewall to Application Server | Internal Firewall | Application Server | Hard Outage |
| 27 | 7.3 | Firewall to Application Server | Internal Firewall | Application Server | Sick-but-not-dead |
| 28 | 8.1 | Application Server to Database Server | Application Server | Database | 1 3DNS Server out of service |
| 29 | 8.2 | Application Server to Database Server | Application Server | Database | |
| 30 | 8.3 | Application Server to Database Server | Application Server | Database | |

FIG. 3C-3

Operational Failure Mitigation Analysis - Root Causes & Recommendations

Project: Login Process

Completed By: _____   Completed Date: _____

| ID | Step Name | Source Component | Destination Component | Destination Component Failure Mode |
|---|---|---|---|---|
| 6.3 | Web Server to Firewall | Web Server | Internal Firewall | Compromised through intrusion |
| 7.3 | Firewall to Application Server | Internal Firewall | Application Server | Compromised through intrusion |
| 1.2 | ISP1 to Routers | ISP1 | External Routers | Degraded functionality, passing traffic but inconsistently [assume happening in all datacenters] |

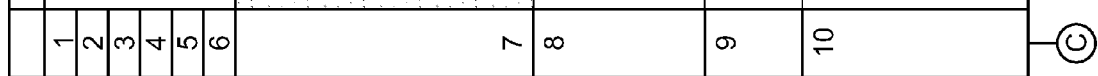

FIG. 3D-1

| G | H | I | J | K |
|---|---|---|---|---|
| mRPN | Root Cause | Occurrence Rate | RPN | Recommendation |
| 10000 | | 5 | 50000 | Document & implement strategy for intrusion detection and response for external DNS servers |
| 7568 | | 5 | 37838 | Document & implement strategy for intrusion detection and response for external DNS servers |
| 1375 | | 5 | 6875 | Address via monitoring strategy action.. we must have visibility into overall traffic volumes through each ISP vendor and monitor for inconsistencies with expected volumes and/or performance (packet loss, etc.) |

FIG. 3D-2

| C | | D | | G |
|---|---|---|---|---|
| 11 | 2.2 | ISP2 to Routers | ISP2 | External Routers | Degraded functionality, passing traffic but inconsistently [assume happening in all datacenters] |
| 12 | 6.1 | Web Server to Firewall | Web Server | Internal Firewall | DNS unavailable in all three datacenters |
| 13 | 7.1 | Firewall to Application Server | Internal Firewall | Application Server | DNS unavailable in all three datacenters |
| 14 | 3.2 | External Routers to Firewalls | External Routers | External Firewalls | Primary device failure (1 datacenter) |
| 15 | 4.2 | Firewalls to Load Balancer | External Firewalls | Load Balancer | Sick-but-not-dead |
| 16 | 6.2 | Web Server to Firewall | Web Server | Internal Firewall | 1 DNS server unavailable |
| 17 | 7.2 | Firewall to Application Server | Internal Firewall | Application Server | 1 DNS server unavailable |
| 18 | 5.2 | Load Balancer to Web Server | Load Balancer | Web Server | 1 Firewall failure in a single facility |

FIG. 3D-3

| (E) | | | (F) |
|---|---|---|---|
| 1375 | | 5 | 6875 | Address via monitoring strategy action.. we must have visibility into overall traffic volumes through each ISP vendor and monitor for inconsistencies with expected volumes and/or performance (packet loss, etc.) |
| 3367 | | 5 | 16835 | Investigate feasibility of utilizing a third party as a tertiary provider of DNS services. This would be a truly rare event, though given the age of the infrastructure and the mechanism by which changes are propogated through DNS.. this could be a real scenario |
| 2548 | | 5 | 12740 | Investigate feasibility of utilizing a third party as a tertiary provider of DNS services. This would be a truly rare event, though given the age of the infrastructure and the mechanism by which changes are propogated through DNS.. this could be a real scenario |
| 171 | | 5 | 855 | |
| 314 | | 5 | 1568 | |
| 333 | | 5 | 1665 | |
| 252 | | 5 | 1260 | |
| 108 | | 5 | 542 | |

FIG. 3D-4

OPERATIONAL FAILURE MITIGATION

FIELD OF TECHNOLOGY

Aspects of the disclosure relate to operational failure. In particular, the disclosure relates to the mitigation of operational failure in a technical or business process.

BACKGROUND

Failure analysis is the process of collecting and analyzing data to determine the cause of a failure and the means to prevent recurrence. It is a tool that is important both in developing new products and improving existing products.

Where failure analysis is applied to a business process, it may be used to identify a weakness which could lead to failure of the process.

Conventional failure analysis tools for evaluating a business process are best suited for understanding the impact of failure on clearly defined process steps for performing a single business function.

Many real-world processes involve multiple business functions. For example, in a technological process, each process step may relate to more than one business function. A process step may have multiple failure modes, each affecting the relevant business functions in different ways. In some instances a failure may not have a great effect on the overall goal of the process, while in other cases it may be critical.

The potential for mitigation is integral to determining the criticality of a failure. Conventional failure analysis typically focuses on root cause elimination rather than mitigation options. In some processes, particularly those involving technology, root cause elimination may not be practical and mitigation is the only option.

It would be desirable, therefore, to provide apparatus and methods to electronically evaluate the criticality of a weakness in a business process. It would be desirable also to incorporate the potential for mitigation into the evaluation.

SUMMARY OF THE INVENTION

It is an object of this invention to provide apparatus and methods for electronically evaluating the criticality of a weakness in a business process. Apparatus and methods for such an electronic evaluation are therefore provided.

The apparatus and methods may compile data related to functions of the business process. The apparatus and methods may also compile data related to the operational steps of the business process. The data may be scored to quantify the priorities within the business process.

The quantified determination of business process priorities may be stored and applied toward failure analysis. The apparatus and methods may compile a list of potential failure modes for the business process. For each failure mode, scoring related to the effect of the failure and the possibility of mitigation may be compiled and stored. The stored data may be applied to calculate a relative criticality for each potential failure mode.

The relative criticalities may be used to prioritize mitigation responses, enabling mitigation recommendations to be targeted to the most critical weaknesses in the business process.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIGS. 3A-3D show illustrative data corresponding to a portion of the process shown in FIG. 2.

DETAILED DESCRIPTION OF THE INVENTION

Figure 1:
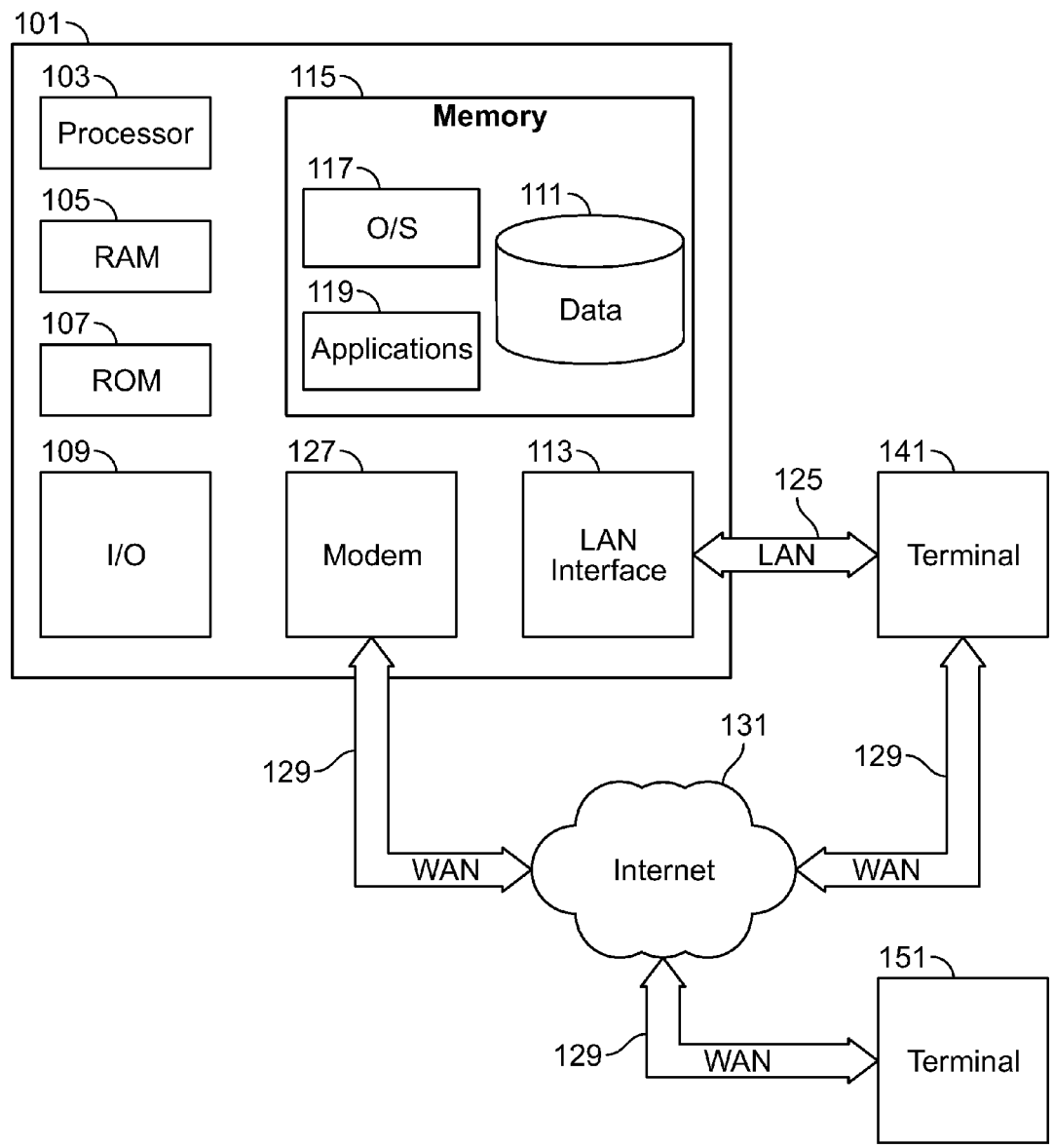
FIG. 1 shows a schematic diagram of apparatus that may be used in accordance with the principles of the invention.

Apparatus and methods for electronically evaluating the criticality of a weakness in a business process are provided. The business process may include one or more device-based steps or sub-processes.

Failure analysis is a process used to evaluate the events surrounding a failure or speculative failure, and identify approaches to prevent or reduce the likelihood of recurrence. It may be applied to the development of new products or the testing of existing products.

In evaluating a business process, conventional failure analysis traces the failure of the overall process back to a single step. The conventional approach is best applied to a simple business process with one goal and a series of defined steps leading to that goal.

The apparatus and methods may electronically evaluate a complex process where the process steps may affect more than one business function. In such a complex process multiple potential failure modes for each process step may produce a variety of effects on the business process.

The apparatus and methods may proceed through a series of stages. Before considering failure modes, the apparatus and methods may incorporate data associated with the business process to quantify the priorities in carrying out the process.

Quantified measures of the criticality of each process step form the basis for subsequent analysis of the effects of a failure, which in turn forms the basis for a calculation quantifying criticality of the failure mode to the business process as a whole. The assessment of the criticality of a failure may be adjusted based on potential mitigation options.

The data incorporated into the evaluation may consist of system data and/or scoring data. System data may relate to the components of the process and may define the business functions of the process, the process steps, the potential failure modes or any suitable component of the process. Scoring data may involve analyst assessment or objective scoring criteria and may be used to quantify the effects of a failure, to assess criticality or for any other suitable purpose.

The data may be organized using a spreadsheet or any other suitable analytical or numerical analysis platform. In addition to organizing the business process data, the platform may also allow the data to be numerically analyzed.

The apparatus and methods may be used in connection with a failure model such as that show in Table 1.

TABLE 1

| Illustrative failure model. | |
|---|---|
| Model Component | Example |
| Business process | User downloads application for product |
|   Business function 1 | Authenticate user |
|     Functional process step 1 | Database engine identifies user database |
|       Failure mode 1 | Connection between database engine and database fails |

TABLE 1-continued

Illustrative failure model.

| Model Component | Example |
| --- | --- |
| Failure mode N | Database engine fails |
| Functional process step N | Database engine receives user ID |
| Business function N | Present graphical control feature |

A functional process step may involve the interaction of two technical components. For example, a database engine may identify a user database. The relationship of the database engine to the database may be referred to as an integration point. The integration point may be subject to fail in one or more modes. The apparatus and methods of the invention may map the failure modes to one or more business functions that depend on the integration point.

In some embodiments, the mapping may involve: 1) prioritizing the business functions; 2) identifying integration points that support the business functions; 3) assigning to each integration point and each business function a respective criticality score; 4) modeling one or more failure modes of each integration point (for example, based on probabilities of occurrence, detection, mitigation, etc.); and 5) applying scores (such as impact, occurrence, detection and mitigation) to a combined business criticality of the integration point to arrive at a modified risk profile number.

The four stages described below, together with Equations 1-5, illustrate a method in accordance with the principles of the invention.

As a first stage, the apparatus and methods may store a list of business functions achieved through the business process. Each business function may be assigned a criticality score (c) based on its criticality to the business process. Equation 1 incorporates the criticality score into a weight for each of these business functions, quantifying its relationship to the business process as a whole.

$$w = c(\sqrt{v})$$ Eqn. 1

In Eqn. 1, the term w corresponds to the weight of the business function and is calculated separately for each business function on the list. The term c corresponds to the criticality of that business function. The term v represents the overall volume (rate of occurrence or performance) of the business function. The term v may be defined as a raw volume or as a percentage of a total volume associated with the business functions in a business process.

As a second stage, the apparatus and methods may store a list of the functional process steps performed in the course of the business process. At this stage, a criticality score may be assigned, quantifying the criticality of each process step to achieving the relevant business function. The criticality score may be based on analyst input or on a suitable objective function.

As a third stage, the apparatus and methods may store a list of potential failure modes for each process step. For example, in a technology process, a connection between two components may fail outright. In a second failure mode, the connection may succeed, but be extremely slow or unresponsive.

The apparatus and methods may incorporate scoring data related to each failure mode on the list. Examples of failure mode scoring data may include the failure occurrence rate, probability of detection, potential for mitigation, the impact of the failure, or any other suitable data.

Equation 2 calculates a modified risk profile number (mRPN) quantifying the criticality of a failure mode based on the failure mode scoring data. A modified risk profile number may be calculated separately for each failure mode in the list. The criticality calculated in Equation 2 is based on the rate and impact of failure combined with the probability of detection and possibility of mitigation. A higher probability of detection as well as a higher possibility of mitigation will lower the risk profile.

$$mRPN = OR*OBI*[10-(0.9)D]*[10-(0.9)R]$$ Eqn. 2

In Eqn. 2, OR represents the occurrence rate for the failure and measures the probability of occurrence. The term OBI stands for the overall business impact and is calculated as described below in Equations 3 and 4. The term D represents the probability of detecting a failure. The term R represents the resiliency in the process step and measures the level of mitigation available.

In Equation 3, the individual business impacts BI of the failure mode are calculated for each of the business functions defined in the first stage.

$$BI = FI*BC$$ Eqn. 3

In Eqn. 3, FI represents failure impact, defined as the impact of a process step failure mode on the failure of the process. BC corresponds to the business function criticality score that was determined in the second stage.

After BI is calculated for each business function, the overall business impact (OBI) for the failure mode may be calculated as shown in Equation 4. The overall business impact factors in the weights for the various business functions established in Eqn. 1.

$$OBI = \frac{\sum (BI_n)(w_n)}{\sum w}$$ Eqn. 4

In Eqn. 4, BI corresponds to business impact of business function n as calculated in Eqn. 3. The term w corresponds to the weight for business function n as calculated in Eqn. 1.

After the modified risk profile number for each failure mode is calculated, the apparatus and methods may flag the failures with the highest modified risk profile numbers for analysis in the fourth stage.

As a fourth stage, the apparatus and methods may store a list of the most critical failures. The failures on the list may be sub-itemized depending on how many potential mitigation plans may be proposed.

In Equation 5, data related to root cause risk and mitigation options may be used to scale the modified risk profile number (mRPN), calculated in Eqn. 4, to arrive at a risk profile number for the failure mode. The risk profile numbers for the different failure modes may quantify the relative criticality of the different weaknesses in the process.

$$RPN = mRPN*OR$$ Eqn. 5

In Eqn. 5, the term RPN is the risk profile number. The term mRPN corresponds to the modified risk profile number calculated in Eqn. 2. The term OR corresponds to the occurrence rate, measured as the root cause risk for the failure mode.

The risk profile numbers may be applied to identify the most critical weaknesses in the business process. Mitigation recommendations may be targeted toward the most critical weaknesses, enabling an analyst to focus on building mitigation plans where they may be most effective.

In some embodiments, the business process evaluated may be a technological process. Business functions may be identified and prioritized based on criticality to the technological process. Each process step may be defined as a technical integration point, corresponding to the interaction between a technical source component and a technical destination component. Each technical integration point may then be assessed to determine its criticality to each business function.

The apparatus and methods may compile a list of failure modes for each technical component integration point. The failure modes may be scored based on the probability of occurrence, detection and mitigation. The scores may be applied to the combined business criticality of the technical component integration point to determine a modified risk profile number for the failure mode.

Embodiments of the invention will now be described with reference to FIGS. 1-3.

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 is a block diagram that illustrates a generic computing device 101 (alternatively referred to herein as a "server") that may be used according to an illustrative embodiment of the invention. The computer server 101 may have a processor 103 for controlling overall operation of the server and its associated components, including RAM 105, ROM 107, input/output module 109, and memory 115.

Input/output ("I/O") module 109 may include a microphone, keypad, touch screen, and/or stylus through which a user of device 101 may provide input, and may also include one or more of a speaker for providing audio output and a video display device for providing textual, audiovisual and/or graphical output. Software may be stored within memory 115 and/or storage to provide instructions to processor 103 for enabling server 101 to perform various functions. For example, memory 115 may store software used by server 101, such as an operating system 117, application programs 119, and an associated database 121. Alternatively, some or all of server 101 computer executable instructions may be embodied in hardware or firmware (not shown). As described in detail below, database 121 may provide storage for business process data, values of elements a risk priority number, values of risk priority numbers, mitigation recommendations and any other suitable information.

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks. When used in a LAN networking environment, computer 101 is connected to LAN 125 through a network interface or adapter 123. When used in a WAN networking environment, server 101 may include a modem 127 or other means for establishing communications over WAN 129, such as Internet 131. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 119, which may be used by server 101, may include computer executable instructions for invoking user functionality related to communication, such as email, short message service (SMS), and voice input and speech recognition applications.

Computing device 101 and/or terminals 141 or 151 may also be mobile terminals including various other components, such as a battery, speaker, and antennas (not shown).

Terminal 151 and/or terminal 141 may be portable devices such as a laptop, cell phone, blackberry, or any other suitable device for storing, transmitting and/or transporting relevant information.

Business process data, values of elements of the risk profile numbers, values of the risk profile numbers, mitigation recommendations and any other suitable information may be stored in memory 115.

One or more of applications 119 may include one or more algorithms that may be used to perform the calculation of elements of the risk profile numbers, risk profile numbers, comparison between risk profile numbers, and any other suitable task related to evaluating the relative criticality of a failure.

The one or more algorithms may include those available in a spreadsheet such as that sold under the trademark EXCEL by the Microsoft Corporation, Redmond, Wash.

The invention may be operational with numerous other general purpose or special purpose computing system environments or configurations. Examples of well known computing systems, environments, and/or configurations that may be suitable for use with the invention include, but are not limited to, personal computers, server computers, hand-held or laptop devices, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
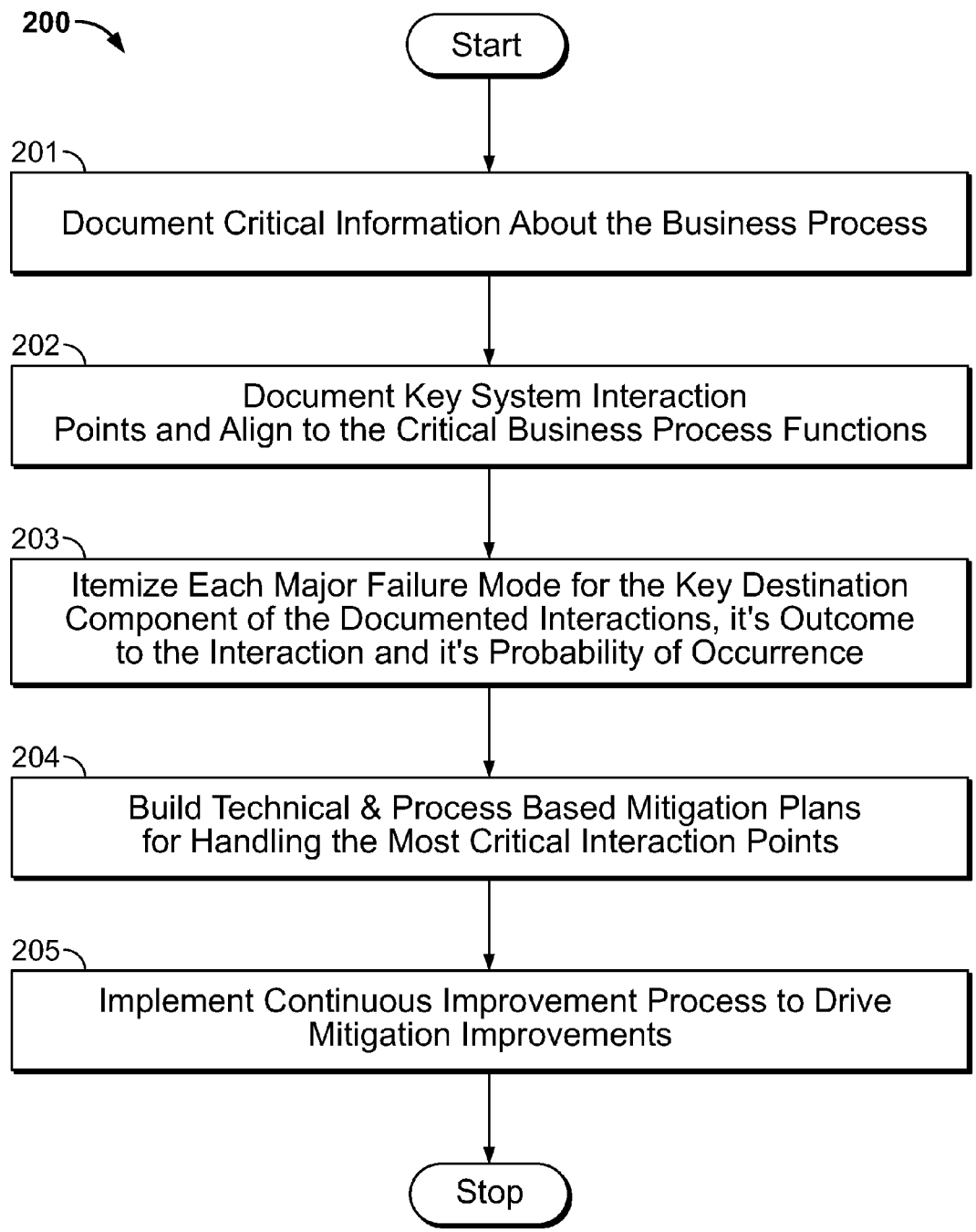
FIG. 2 is a flow diagram of a process in accordance with the principles of the invention.

FIG. 2 is a flow diagram illustrating process 200 for evaluating a business process. At each step in process 200, data is compiled in the analysis tool and stored in processor memory. Process 200 proceeds through a series of steps, each incorporating some or all of the earlier, stored data. The process may also apply the data to calculations such as the ones set forth in Equations 1-5, above.

At step 201, key information related to the business process is compiled and stored. At step 202, information related to the key interaction points in the process is compiled and aligned to the critical business process functions stored at step 201. At step 203, failure modes are itemized for the destination components of the interactions. For each failure mode, its effect on the interaction and its probability of occurrence are analyzed. At step 204, technical and process based mitigation plans are built for handling the most critical interaction points. At step 205, a continuous improvement process is implemented to drive mitigation improvements.

FIGS. 3A-3D show views of illustrative matrix 300. Matrix 300 includes business process data corresponding to a portion of process 200 (shown in FIG. 2). The illustrative business process displayed in matrix 300 is an online login process.

Equation 5 may be used to quantitatively evaluate the relative criticality of a failure mode. Matrix 300 shows different stages in the calculation of Equation 5 and its terms. In the embodiment shown in FIGS. 3A-3D, matrix 300 is displayed and processed as a spreadsheet, but any suitable machine-based computational platform may be used.

The embodiment shown in FIGS. 3A-3D incorporates both system and scoring data. Scoring data may be entered based on analyst assessment or objective scoring criteria. In FIGS. 3A-3D, specific parameters are established for scoring, but any suitable scoring system may be used.

FIG. 3A corresponds to step 201 of process 200. Cells A6 though B9 show the itemized list of business functions associated with the online login process. Cells C6 through C9 show the business criticality scores, ranking the importance of each function to the online login process on a scale of 1 to 10. Cells D6 through D9 show the transaction volume for each business function. Cells E6 through E9 show the weight for each business function, calculated as shown in Equation 1.

FIG. 3B corresponds to step 202 of process 200. Cells A8 through B15 show process steps carried out in the course of the online login process. Cells C8 though D15 show the source component and destination component for each of the process steps. The interaction between a source component and a destination component is termed an integration point. Each integration point may be considered as a potential source for process failure.

Cells E8 through H15 form the business criticality matrix. The business functions itemized in FIG. 3A may be pre-populated at cells E7 through H7 in FIG. 3B. Within the business criticality matrix, each process step is scored at 1, 5 or 10, based on its importance to successfully achieving a business function.

Figures 3, 3C, 4:
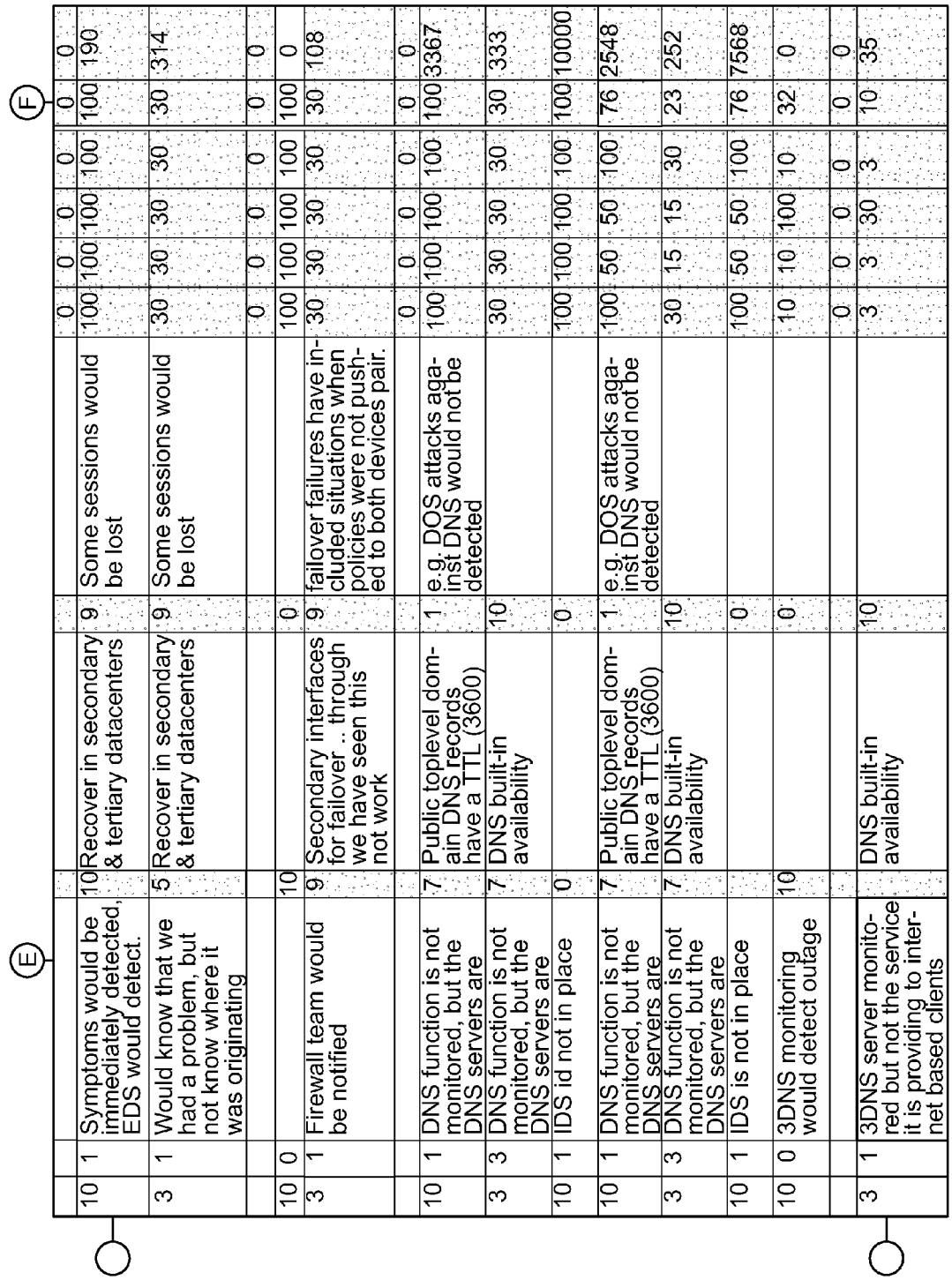

FIG. 3C corresponds to step 203 of process 200. At cells A7 through E30, the process steps compiled in FIG. 3B are itemized by the individual potential failure modes for each process step. For example, cells A7 through E9, show three potential failure modes for the first process step identified in FIG. 3B. Identification numbers 1.1, 1.2 and 1.3 are assigned to these three failure modes. Altogether, 30 failure modes are identified for the 8 interaction points listed in FIG. 3B.

Cells F7 through F30, show the failure impact for each failure mode, scored at 1, 3, 5, 7, 9 or 10, based on the impact of the process step failure mode on the failure of the process.

Cells G7 through G30, show the failure occurrence rate, scored as a probability of occurrence.

Cells H7 through I30, show the probability of detection for the failure mode, scored on a 0 to 10 scale.

Cells J7 through K30, show the resiliency level for the failure mode. Resiliency measures the level of mitigation available, scored on a 0 to 10 scale.

Cells L7 through L30, show summaries of the general impact or effect of the failure.

Cells M7 through P30, show the determinations of the individual business impacts of each failure mode for each business function associated with the process. The business functions itemized in FIG. 3A may be pre-populated at cells M6 through P6. The business impacts are calculated as shown in Equation 3.

Cells Q7 through Q30, show the overall business impact for each failure mode, calculated as shown in Equation 4.

Cells R7 through R30, show the modified risk profile number for each failure mode, calculated as shown in Equation 2.

FIG. 3D shows the root cause analysis and mitigation planning associated with the critical failure modes. The failure modes are prioritized based on the modified risk profile numbers shown in FIG. 3C (at cells R7 through R30).

At cells A8 through G18, the prioritized failure modes and their corresponding modified risk profile numbers may be pre-populated into the matrix. At cells H8 through I18 the analyst may evaluate the root cause for each failure mode and score the occurrence rate, measuring root cause risk, at 1, 5 or 9. Cells J8 through J18 show a risk profile number for each failure mode, calculated as shown in Equation 5.

At cells K8 through K18, mitigation recommendations are documented. These recommendations are now specifically targeted toward the most critical weaknesses in the business process.

Thus, apparatus and methods for electronically evaluating the criticality of a weakness in a business process are therefore provided. Persons skilled in the art will appreciate that the present invention can be practiced by other than the described embodiments, which are presented for purposes of illustration rather than of limitation, and that the present invention is limited only by the claims that follow.

What is claimed is:

1. A system for electronically evaluating criticality of a weakness in a business process, the system comprising:
   an input module configured to receive business process system data and business process scoring data, wherein the business process scoring data comprises a resiliency score quantifying a level of mitigation available for a failure mode;
   a processor configured to assess the criticality of a weakness in the business process, the criticality dependent on the business process system data and the business process scoring data; and
   an output module configured to output a score quantifying the criticality of the weakness,
   wherein the criticality of the weakness in the business process is a modified Risk Profile Number (mRPN) defined by the equation $mRPN = OR*OBI*[10-(0.9)D]*[10-(0.9)R]$, wherein:
   OR comprises an occurrence rate for a failure;
   OBI comprises an overall business impact;
   D comprises a probability of detecting a failure; and R comprises the resiliency score quantifying the level of mitigation available for the failure mode.

2. The system of claim 1 wherein the business process system data comprises data related to a business function of the business process.

3. The system of claim 1 wherein the business process system data further comprises data related to a functional process step carried out in the course of the business process.

4. The system of claim 3 wherein the business process scoring data comprises data related to a failure of a functional process step.

5. A non-transitory computer readable storage medium having a computer readable program code embodied therein, the computer readable program code adapted to be executed to implement a method for evaluating criticality of a weakness in a business process, said method comprising:
receiving business process system data, and storing the business process system data in machine readable memory;
receiving business process scoring data, and storing the business process scoring data in machine readable memory, wherein the business process scoring data comprises a resiliency score quantifying a level of mitigation available for a failure mode;
using a processor module, calculating a score quantifying the criticality of a weakness in the business process, the score dependent on the business process system data and the business process scoring data,
wherein the criticality of the weakness in the business process is a modified Risk Profile Number (mRPN) defined by the equation $$mRPN = OR*OBI*[10-(0.9)D]*[10-(0.9)R],$$

wherein:
OR comprises an occurrence rate for a failure;
OBI comprises an overall business impact;
D comprises a probability of detecting a failure; and
R comprises the resiliency score quantifying the level of mitigation available for the failure mode.

6. The media of claim 5 wherein, in the method, the business process system data comprises:
a business function associated with the business process; and
a measure of transaction volume associated with the business function.

7. The media of claim 5 wherein, in the method, the business process system data further comprises:
a functional process step carried out in the course of the business process; and
the failure mode of the functional process step.

8. The media of claim 7 wherein, in the method, the functional process step is defined as the integration between a source component and a destination component.

9. The media of claim 7 wherein, in the method, the business process scoring data comprises a failure occurrence rate score quantifying the probability of occurrence for the failure mode.

10. The media of claim 7 wherein, in the method, the business process scoring data comprises a failure detection score quantifying a probability of detecting the failure mode.

11. The media of claim 5 wherein, in the method, the processor module is further configured to calculate a weight for each business function, the weight dependent on the transaction volume and a criticality score.

12. The media of claim 5 wherein the processor is further configured to calculate a risk profile number, quantifying the criticality of the weakness and the possibility of mitigation.

13. A method for electronically evaluating criticality of a weakness in a business process, the method comprising:
receiving business process system data, and storing the business process system data in machine readable memory;
receiving business process scoring data, and storing the business process scoring data in machine readable memory, wherein the business process scoring data comprises a resiliency score quantifying a level of mitigation available for a failure mode; and
using a processor, calculating a score quantifying the criticality of a weakness in the business process, the criticality dependent on the business process system data and the business process scoring data,
wherein the criticality of the weakness in the business process is a modified Risk Profile Number (mRPN) defined by the equation $$mRPN = OR*OBI*[10-(0.9)D]*[10-(0.9)R],$$

wherein:
OR comprises an occurrence rate for a failure;
OBI comprises an overall business impact;
D comprises a probability of detecting a failure; and
R comprises the resiliency score quantifying the level of mitigation available for the failure mode.

14. The method of claim 13 wherein the business process system data comprises:
a business function achieved through the business process;
a functional process step associated with carrying out the process; and
the failure mode of the functional process step.

15. The method of claim 14 wherein the business process scoring data comprises:
an assessment of the criticality of a business function to the success of the business process; and
an assessment of the criticality of a functional process step to the achievement of the business function.

16. The method of claim 13 wherein the business process scoring data comprises an assessment of the probability of detecting a failure mode.

* * * * *